No. 655,381. Patented Aug. 7, 1900.
J. STROMEYER.
BRAKE SHOE.
(Application filed Oct. 11, 1899.)
(No Model.)

Witnesses.

Inventor.
Julius Stromeyer
by
Thomas D. Mowlds
Attorney.

UNITED STATES PATENT OFFICE.

JULIUS STROMEYER, OF PHILADELPHIA, PENNSYLVANIA.

BRAKE-SHOE.

SPECIFICATION forming part of Letters Patent No. 655,381, dated August 7, 1900.

Application filed October 11, 1899. Serial No. 733,264. (No model.)

*To all whom it may concern:*

Be it known that I, JULIUS STROMEYER, a citizen of the United States, residing at Philadelphia, in the county of Philadelphia and State of Pennsylvania, have invented certain new and useful Improvements in Wagon and Car Brakes, of which the following is a specification, reference being had therein to the accompanying drawings.

My invention relates to brakes for wagons, cars, and similar vehicles, and has special reference to that class of brakes in which an iron brake-shoe is used.

The object of my improvement is to increase the efficiency of the brake-shoe without adding to the cost or using any complicated mechanism.

To accomplish the desired result, I form in that part of the brake-shoe that comes in contact with the tire of the wheel small pockets or receptacles that are adapted to be filled up with sand, against which the tire will rub, thus forming a frictional contact between the brake-shoe and wheel-tire much greater in efficiency than when the face of the brake-shoe has one unbroken surface. The particular arrangement of the brake and the manner of attaching it to a vehicle is shown and described in the patent granted to me on July 25, 1899, and numbered 629,403.

Figure 1:
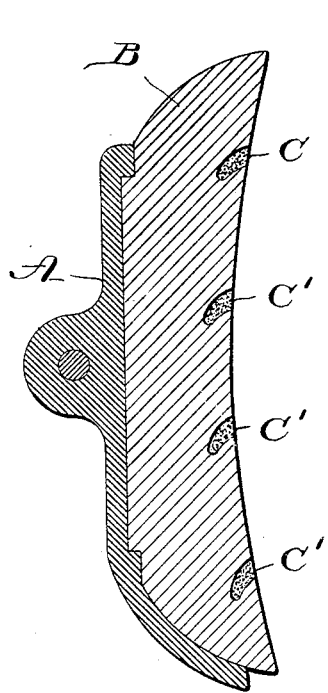
Figure 2:
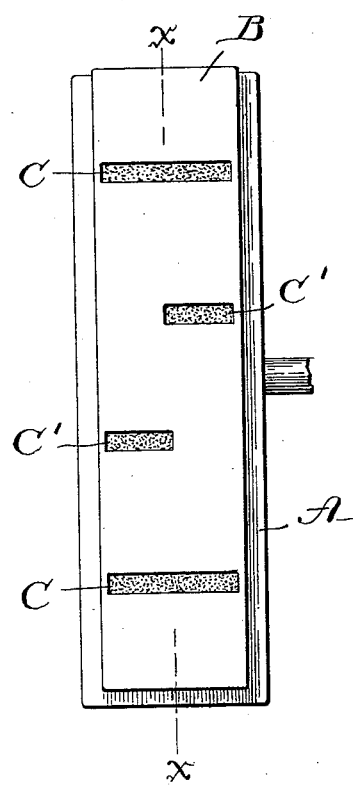

In the accompanying drawings, Figure 1 is a vertical sectional view through the brake-shoe and the frame holding it in position, as on line *x x* of Fig. 2. Fig. 2 is a plan view showing the part of the brake-shoe that comes in contact with the tire of the wheel.

A represents the iron-casting that forms the frame or carrier for the brake-shoe.

B is the brake-shoe, which is preferably made of iron.

C and C' are the sand pockets or receptacles. These pockets are made to extend downwardly in the manner shown in Fig. 1, and may reach clear across the surface of the shoe or extend only partially over. The opening in the pocket may be of any desired size, and the number of said pockets may be increased or diminished as found most suitable for the purpose. When the brake is first put on the wheel, the pockets in the brake-shoe are filled with sand, after which they will never need refilling, as the mud and dirt scraped off from the wheel will always keep them filled up. A brake-shoe provided with a number of the sand-pockets will present to the tire of the wheel a rubbing-surface that consists partly of sand and grit and partly of iron, thus very much increasing the efficiency.

Having thus described my invention, what I claim as new is—

A brake having in the rubbing-surface thereof downwardly-inclined pockets or receptacles, adapted to hold loose sand or other gritty substance and to distribute the same between the surface of the brake-shoe and the periphery of the wheel, whereby the efficiency of the brake is increased, as set forth.

In testimony whereof I affix my signature in presence of two witnesses.

JULIUS STROMEYER.

Witnesses:
THOS. D. MOWLDS,
SAML. H. KIRKPATRICK.